(12) United States Patent
Oved et al.

(10) Patent No.: US 8,333,398 B2
(45) Date of Patent: Dec. 18, 2012

(54) INJURY PROTECTION ACCESSORY

(76) Inventors: Elad Oved, Tel Aviv (IL); Meir Gitelis, Tel Aviv (IL)

( * ) Notice: Subject to any disclaimer, the term of this patent is extended or adjusted under 35 U.S.C. 154(b) by 0 days.

(21) Appl. No.: 13/062,510

(22) PCT Filed: Sep. 6, 2009

(86) PCT No.: PCT/IL2009/000859
§ 371 (c)(1),
(2), (4) Date: Mar. 6, 2011

(87) PCT Pub. No.: WO2010/026585
PCT Pub. Date: Mar. 11, 2010

(65) Prior Publication Data
US 2011/0163557 A1    Jul. 7, 2011

Related U.S. Application Data

(60) Provisional application No. 61/094,983, filed on Sep. 8, 2008.

(51) Int. Cl.
*B62J 27/00*    (2006.01)
(52) U.S. Cl. ..................... 280/304.3; 293/128
(58) Field of Classification Search ............... 280/288.4, 280/304.3, 304.4; 293/126, 128; 472/28–40, 472/43–45, 130, 135
See application file for complete search history.

(56) References Cited

U.S. PATENT DOCUMENTS

| | | | | |
|---|---|---|---|---|
| 1,473,956 | A * | 11/1923 | Eyre et al. | 280/288.4 |
| 3,517,222 | A * | 6/1970 | Wallentowitz | 327/398 |
| 4,536,005 | A | 8/1985 | Tanaka et al. | |
| 4,650,204 | A | 3/1987 | Bothwell | |
| 4,813,706 | A * | 3/1989 | Kincheloe | 280/756 |
| 4,825,503 | A | 5/1989 | Shiramasa et al. | |
| 5,029,894 | A | 7/1991 | Willman | |
| 6,154,924 | A | 12/2000 | Woo | |
| 7,077,440 | B1 | 7/2006 | Morales et al. | |
| 7,108,273 | B2 * | 9/2006 | Hunwardsen | 280/291 |
| 7,159,887 | B2 * | 1/2007 | Barnes | 280/291 |
| 7,175,200 | B1 * | 2/2007 | Obershan | 280/756 |
| 7,905,789 | B2 * | 3/2011 | Collins et al. | 472/43 |
| 2003/0102657 | A1 | 6/2003 | Kuo et al. | |
| 2004/0251715 | A1 | 12/2004 | Tahara et al. | |
| 2005/0035583 | A1 | 2/2005 | Hinton et al. | |

FOREIGN PATENT DOCUMENTS

EP    0891920 B1    1/1999

* cited by examiner

*Primary Examiner* — Tony Winner
(74) *Attorney, Agent, or Firm* — Daniel J. Swirsky; AlphaPatent Associates Ltd.

(57) ABSTRACT

An injury protection accessory for a riding vehicle (e.g., motorcycle), the accessory comprising: at least one shield (4), disposed at the side(s) of the riding vehicle, the shield comprising: a substantially vertical hinge (12), attached to the body or the chassis of the riding vehicle; and one or more substantially horizontal bars (10), attached to the hinge; the shield having an open state, in which one edge of the shield is separated from the body of the vehicle, thereby allowing the rider thereof to get off the vehicle, and a closed state, in which both sides of the shield are engaged with the body of the vehicle, thereby protecting the rider from injury.

10 Claims, 10 Drawing Sheets

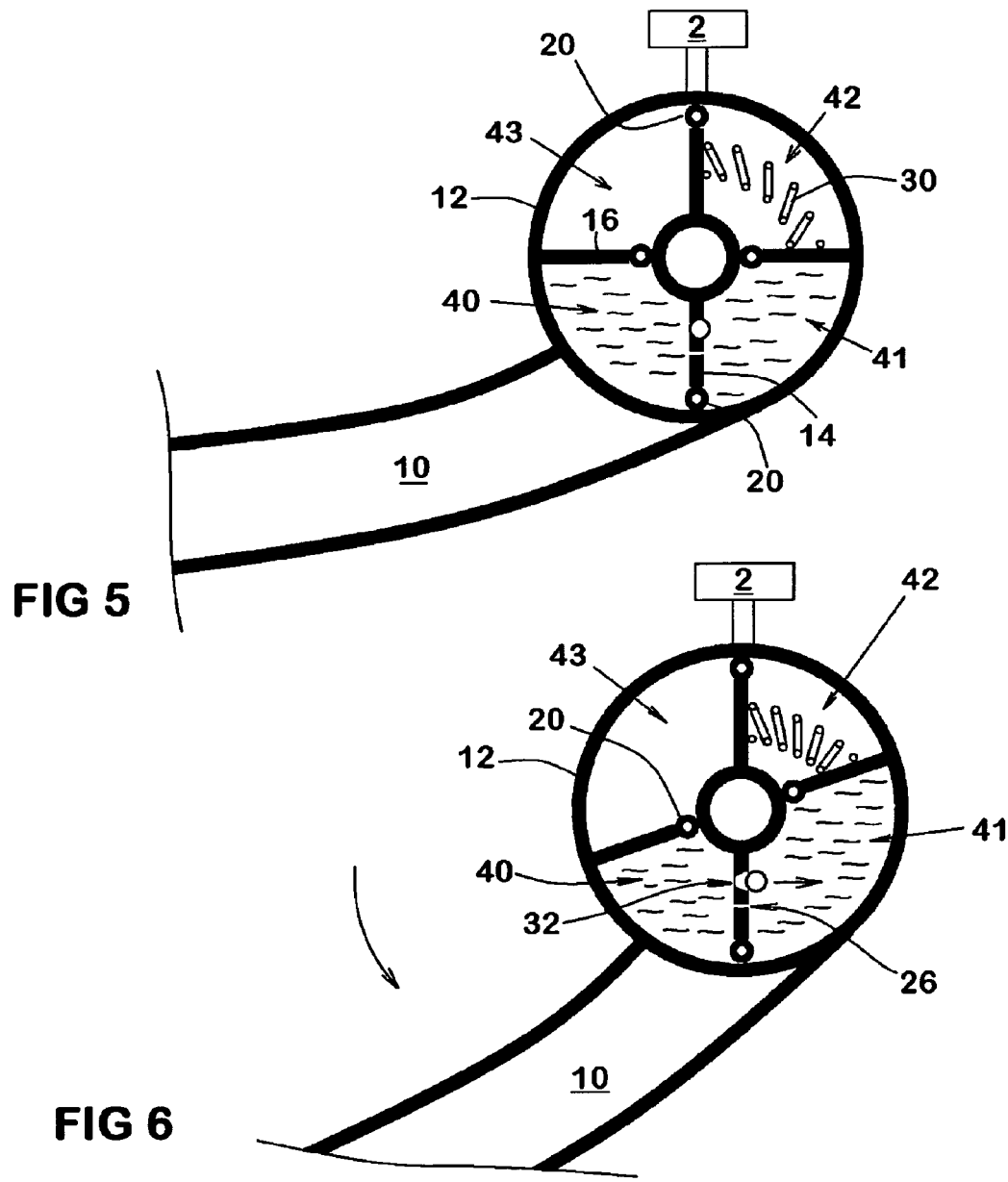

INJURY PROTECTION ACCESSORY

CROSS-REFERENCE TO RELATED APPLICATIONS

The current application is a U.S. National Phase Application under 35 U.S.C. 371 of PCT International Application No. PCT/IL2009/000859, which has an international filing date of Sep. 6, 2009, and which claims the benefit of priority from U.S. Provisional Patent Application No. 61/094,983, filed 08 Sep. 2008, the disclosures of which are incorporated herein by reference.

FIELD OF THE INVENTION

The present invention relates to the field of protection accessories for riding vehicles, such as two- and three-wheeled vehicles, especially against injury.

BACKGROUND OF THE INVENTION

The term Riding Vehicle refers herein to a vehicle on which the user thereof rides, such as motorcycle, bicycle, tricycle, and so on.

Riders of riding vehicles are more exposed to injuries due to accident or skidding than drivers of four-wheeled vehicles. A well-known solution to this problem is the crash bar, such as described and illustrated in U.S. Pat. No. 6,758,484 to Henry Rice. It discloses a crash bar designed and configured to prevent slippage of a rider's feet therefrom and to provide the motorcycle with protection against damage, should it fall over. The crash bar is of a tubular configuration constructed of steel and defines a C-shaped portion serving as a first foot support surface, while a top member provides a second foot support surface. Spherical-shaped, chrome abutment elements are welded to the crash bar and provide a restraint against which the rider's feet bear, thus preventing his feet from slipping while riding.

However, the crash bar bears a substantial drawback, as it does not provide protection from a hit from the rider's side. For example, when a car crashes into the rider from his side, there is no barrier between the rider and the car.

It is an object of the present invention to provide a solution to the above-mentioned and other problems of the prior art.

Other objects and advantages of the invention will become apparent as the description proceeds.

SUMMARY OF THE INVENTION

In one aspect, the present invention is directed to an injury protection accessory for a riding vehicle (e.g., motorcycle), the accessory comprising:
at least one shield (4), disposed at the side(s) of the riding vehicle, the shield comprising:
 a substantially vertical hinge (12), attached to the body or the chassis of the riding vehicle; and
 one or more substantially horizontal bars (10), attached to the hinge;
the shield having an open state, in which one edge of the shield is separated from the body of the vehicle thereby allowing the rider thereof to get off the vehicle, and a closed state, in which both sides of the shield are engaged to the body of the vehicle, thereby protecting the rider from injury.

The accessory may further comprise a clipping mechanism (not illustrated), for clipping the shield to the body or the chassis of the riding vehicle.

The accessory may further comprise an auto-return mechanism of the shield (illustrated in FIGS. 5 and 6), for automatically returning the shield from the open state thereof to the closed state thereof.

According to one embodiment of the invention, the auto return mechanism comprises:
 a receptacle (e.g., hinge 12) connected to the body of the vehicle, the space of the receptacle being partitioned into two compartments (40, 41) by a septum (14) attached to the bars (10);
 a one-way valve (32) disposed in the septum (14), for allowing substance (fluid, air) passage from one of the compartments (40) to the other of the compartments (41) in a first amount per time unit;
 a nozzle disposed in the septum (14), for allowing the substance to pass back (from compartment 41 to compartment 40) in a second amount per time unit, wherein the first amount is greater that the second amount; and
 a mechanism for applying force on the septum (14) to turn the bars (10) back.

According to one embodiment of the invention, the mechanism for applying force on the septum is a spring (30).

According to one embodiment of the invention, the closed space is a part of the interior part of the hinge (12).

The auto return mechanism may be a purely mechanical mechanism (e.g., a spring which in the closed state pulls bars 10 towards the vehicle, and in the open state pulls bars 10 to the closed state thereof), an hydraulic mechanism, a pneumatic mechanism, and so on.

The clipping mechanism may be based on hook(s), magnetic clip(s), and so on.

According to one embodiment of the invention, the length of the bars is adjustable. Also, the curvature of the bars may be adjustable. These features may be achieved, e.g., by combining segments of different lengths/curvatures.

The material of the shield may be based on steel, titanium, aluminum, plastic, metal in general, and so on.

The riding vehicle may be a two-wheeled vehicle, a three-wheeled vehicle, and so on.

According to one embodiment of the invention, the accessory further comprises a wheeled peg assembly, for retaining the vehicle upright when slowing down, and a mechanism for lifting up and lowering down the pegs of the wheeled peg assembly.

According to one embodiment of the invention, the assembly comprises at least two pegs (34), each at other side (left/right) of the vehicle, thereby supporting the vehicle from both sides thereof.

The assembly may comprise a pedal (36), for lowering the pegs, and a spring (not illustrated), for lifting up the pegs upon releasing the pedal.

According to one embodiment of the invention, the mechanism for lifting and lowering the pegs of the wheeled peg assembly is based on a controller analyzing if the vehicle is about to stop or accelerate, lifting the wheeled pegs thereof if the vehicle is accelerating, and lowering the wheeled pegs if the vehicle is about to stop.

The analysis of whether the vehicle is about to stop or accelerate may be based on analyzing the velocity and acceleration/deceleration of the vehicle.

The foregoing embodiments of the invention are described and illustrated in conjunction with systems and methods thereof, which are meant to be merely illustrative, and not limiting.

BRIEF DESCRIPTION OF THE DRAWINGS

Embodiments and features of the present invention are described herein in conjunction with the following drawings:

FIGS. 5 and 6 schematically illustrate two states, which demonstrate a hydraulic closing mechanism of an IPA, according to one embodiment of the invention.

Figure 11:
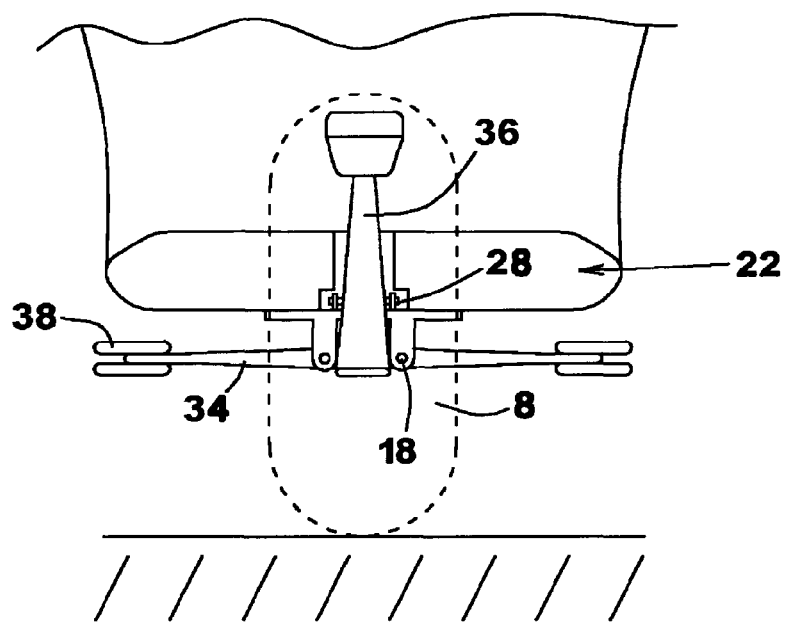
Figure 12:
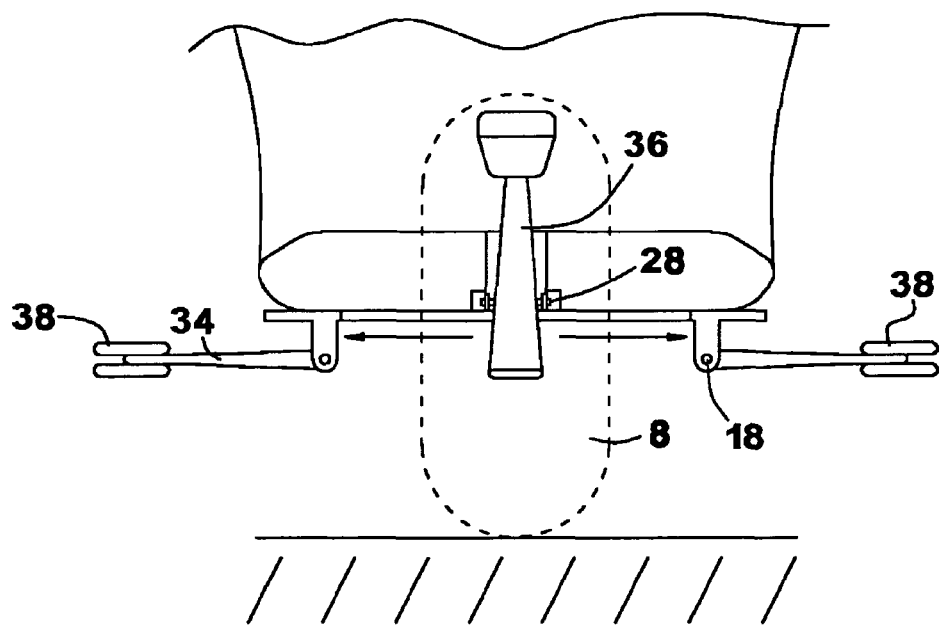
Figure 13:
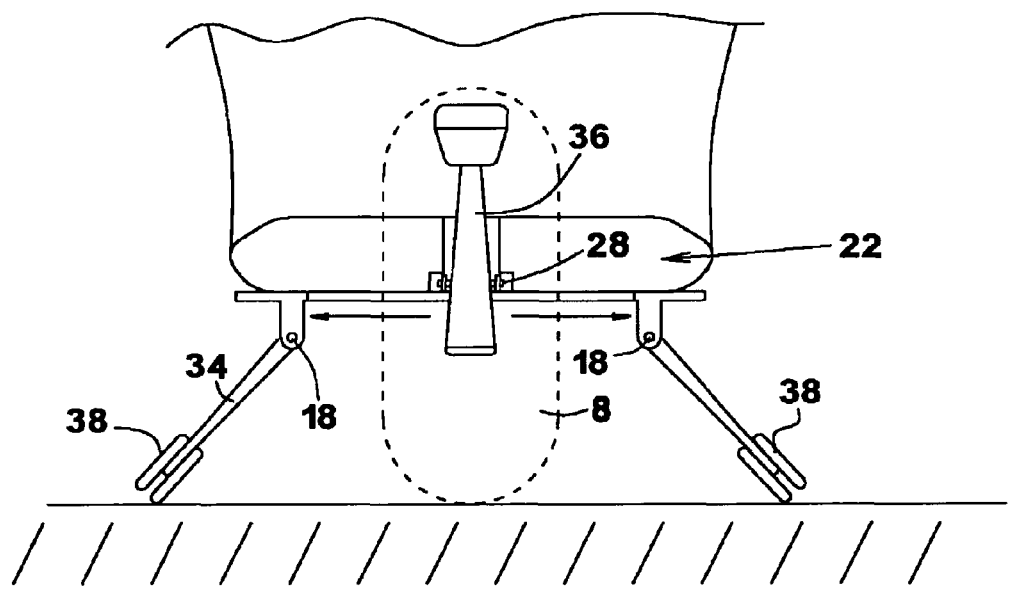

Each of FIGS. 11, 12 and 13 is a front view of a motorcycle, which schematically illustrates a stage in lowering the peg of a WPA, according to another embodiment of the invention.

Figure 14:
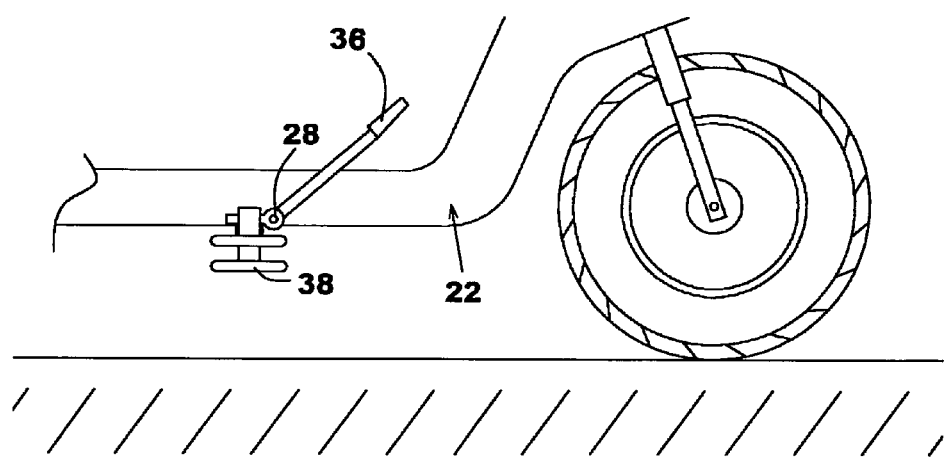

FIG. 14 is a side view of FIGS. 11 and 12.

Figure 15:
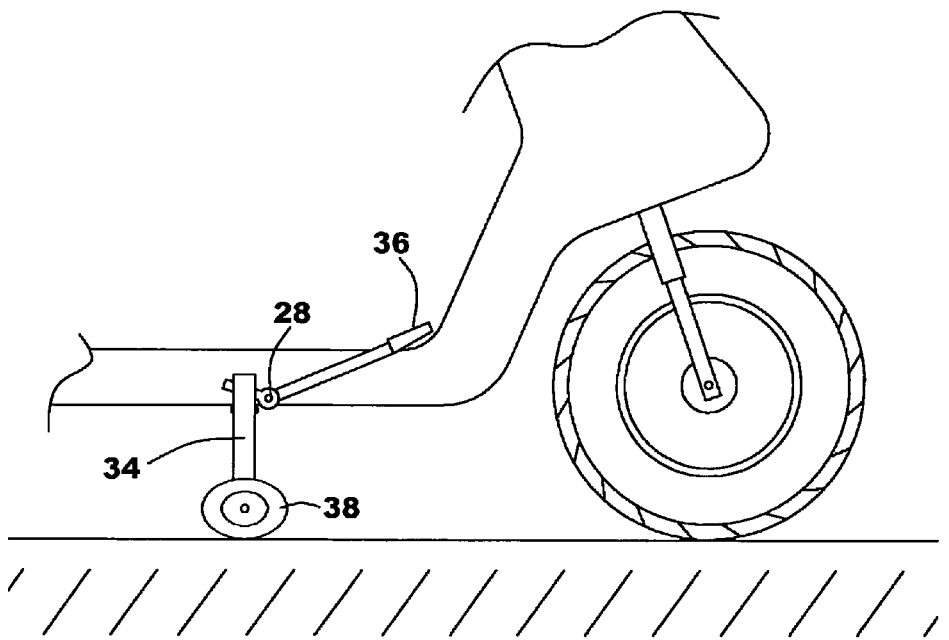

FIG. 15 is a side view of FIG. 13.

It should be understood that the drawings are not necessarily drawn to scale.

DETAILED DESCRIPTION OF PREFERRED EMBODIMENTS

The present invention will be understood from the following detailed description of preferred embodiments, which are meant to be descriptive and not limiting. For the sake of brevity, some well-known features, methods, systems, procedures, components, circuits, and so on, are not described in detail.

The term Injury Protection Accessory (IPA) refers herein to a protection accessory against injury for a two- or three-wheeled vehicle (such as motorcycle).

Figure 1A:
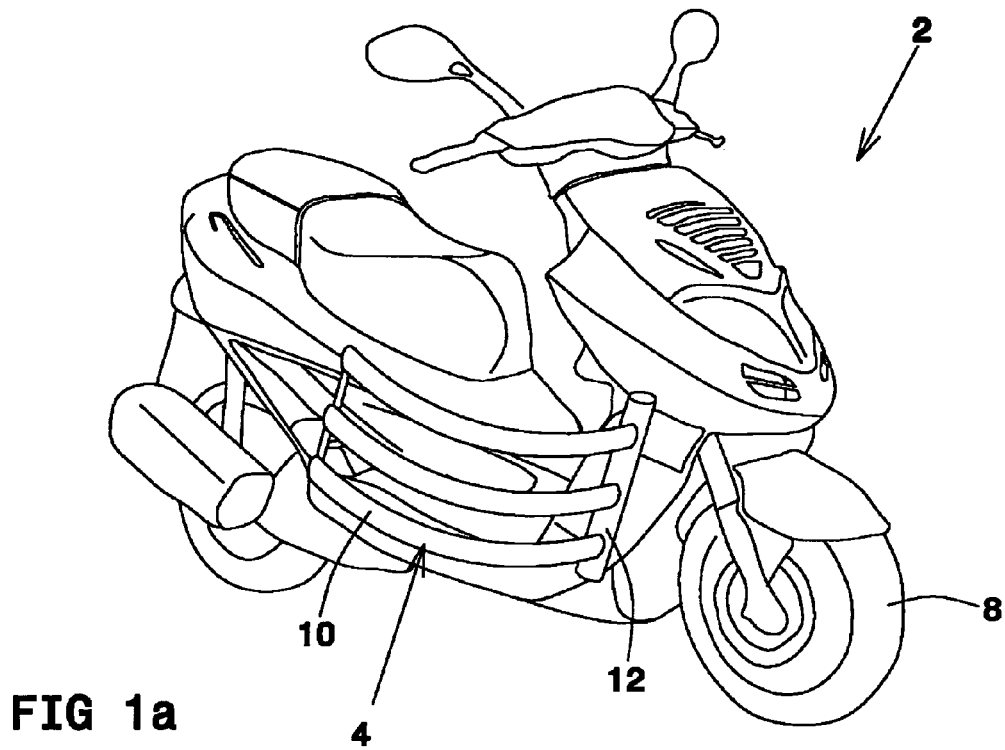
FIG. 1a is a perspective view that schematically illustrates a motorcycle comprising an injury protection accessory (IPA) in its open state, according to one embodiment of the invention.

FIG. 1a is a perspective view that schematically illustrates a motorcycle comprising an injury protection accessory (IPA) in its open state, according to one embodiment of the invention.

Figure 1B:
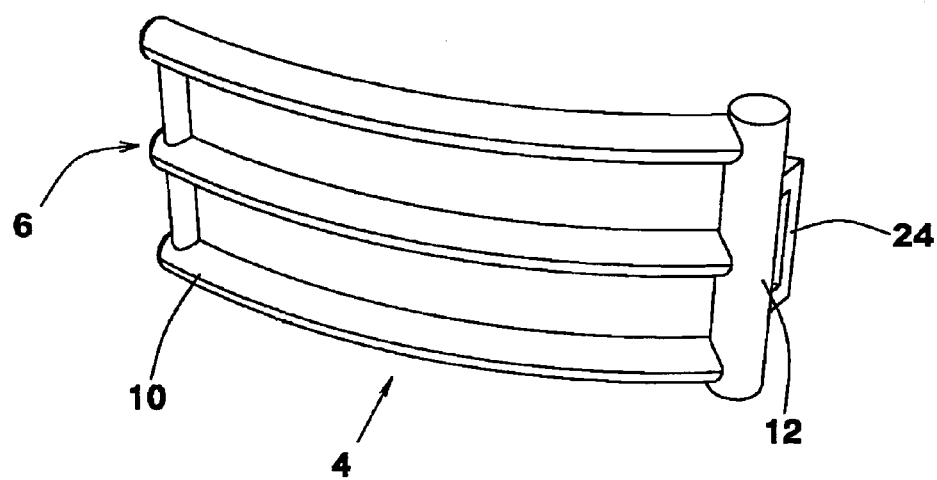
FIG. 1b is a perspective view that schematically illustrates an injury protection accessory (IPA), according to one embodiment of the invention
Figure 2:
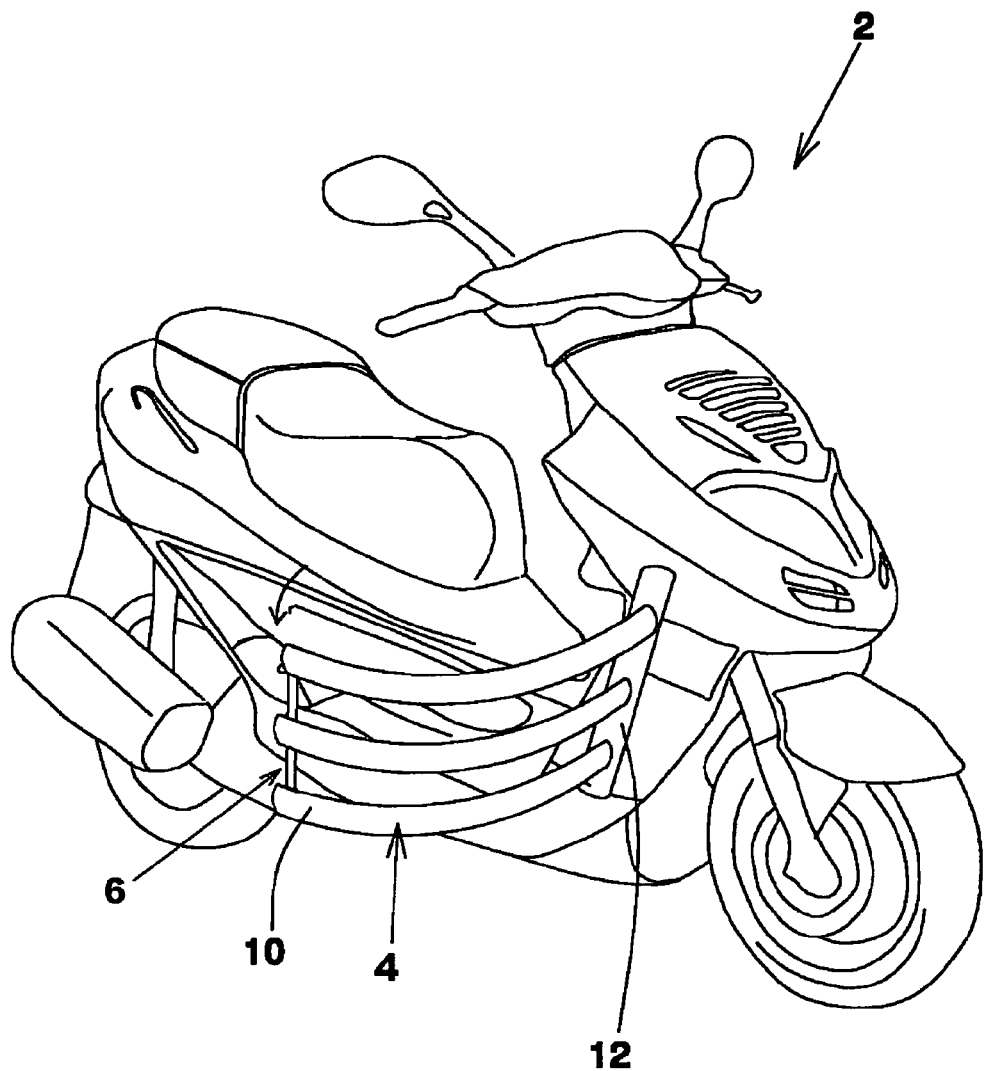
FIG. 2 is a perspective view that schematically illustrates the IPA of FIG. 1a in its closed state, according to one embodiment of the invention.

FIG. 1b is a perspective view that schematically illustrates an injury protection accessory (IPA), according to one embodiment of the invention FIG. 2 is a perspective view that schematically illustrates the IPA of FIG. 1a in its closed state, according to one embodiment of the invention.

Motorcycle 2 employs one IPA 4 on each side thereof, i.e., one on its left side and one on its right side.

According to this embodiment of the invention, the IPA is in the form of a shield composed of three arcs (bars) 10 rotatable around a hinge 12, which is attached to the chassis of the motorcycle.

Shield 10 is made of solid material such as steel, capable of resisting a hit that may be caused by an accident. Preferably, the material is of "low" specific gravity, such as titanium and plastic.

According to this embodiment of the invention, the IPA has two states: A "closed" state, which suits the situation of the motorcycle in motion, and an "open" state, which suits the situation when the user intends to get off the motorcycle. In the closed state, side 6 of IPA 4, which is the side opposite to hinge 12, is expelled from the body of motorcycle 2; in the open state, side 6 of IPA 4 is fastened or at least close to the body of motorcycle 2.

Figure 3:
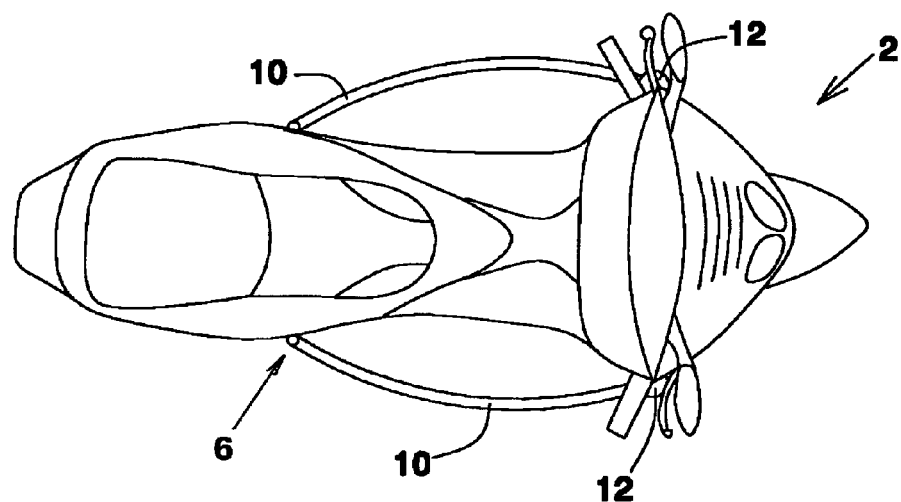
FIG. 3 is a top view of motorcycle 2 of FIG. 1a, which schematically illustrates IPA 4 in its closed state.
Figure 4:
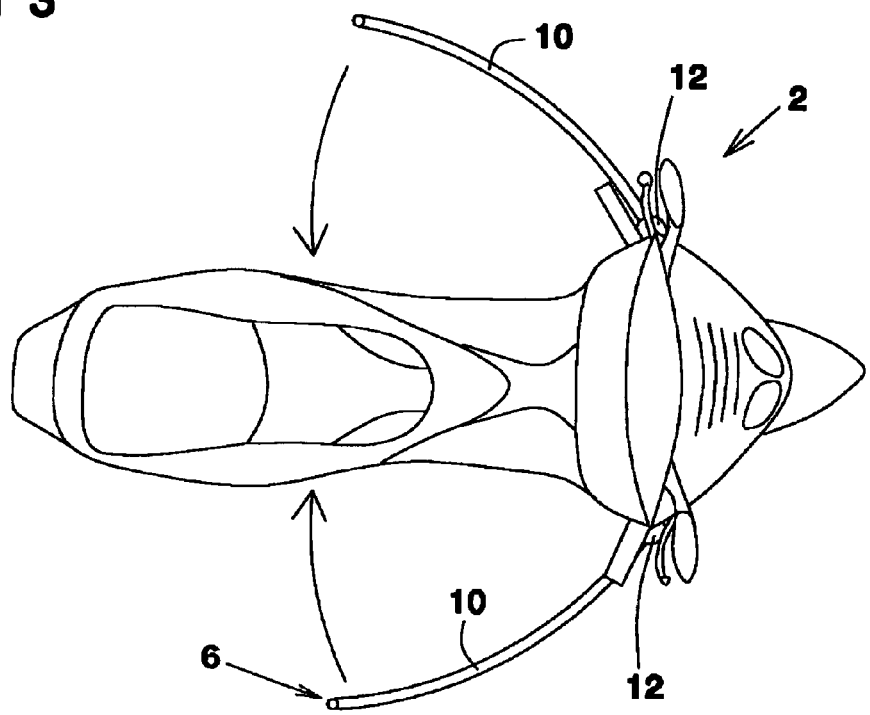
FIG. 4 is a top view of motorcycle 2 of FIG. 1a, which schematically illustrates IPA 4 is in its open state.

FIG. 3 is a top view of motorcycle 2 of FIG. 1, which schematically illustrates IPA 4 in its closed state; FIG. 4 is a top view of motorcycle 2 of FIG. 1, which schematically illustrates IPA 4 is in its open state.

FIGS. 5 and 6 schematically illustrate two states, which demonstrate a hydraulic closing mechanism of an IPA, according to one embodiment of the invention.

According to this embodiment of the invention, the closing mechanism allows automatic return (i.e., self return) of the shield from the open state of the IPA to its closed state.

Referring to FIGS. 5 and 6, some of the interior space of hinge 12 (e.g., 10 cm of the length of the hinge) is partitioned into four compartments, 40, 41, 42 and 43. The partition comprises two walls (septums), marked by reference numerals 14 and 16. Reference numeral 14 denotes the "vertical" wall (substantially vertical in the illustrations), and reference numeral 16 denotes the "horizontal" wall (substantially horizontal in the illustrations). The "vertical" septum 14 is connected to the chassis of motorcycle 2, and the "horizontal" septum 16 is connected to shield 10 of the IPA.

Compartments 40 and 41 are a closed space, which contains fluid, such as oil. As shield 10 rotates in the direction of the illustrated arrow of FIG. 6 (i.e., from the closed to the open state thereof), the space of compartment 40 decreases, and the space of compartment 41 increases in the same portion. The one-way valve 32 allows fluid passage from compartment 40 into compartment 41, as illustrated in FIG. 6.

Spring 30 applies a force for turning the IPA from the open state thereof to the closed state thereof. Thus, when the rider leaves the shield, they rotate back due to the force applied by spring 30.

Nozzle 26 connects the space of compartment 40 with that of compartment 41. The object of nozzle 26 is to allow "slow" fluid passage therethrough.

When the user turns shield 10 from the closed state to the open state of the IPA, fluid passes from compartment 40 to compartment 41 mainly through one-way valve 32. However, when the user leaves the shield, spring 30 causes the IPA to return to its closed state. The return is carried out "slowly" due to the passage of the fluid from compartment 41 to 40 through nozzle 26.

Thus, this mechanism provides automatic rotation of shield 10 from the open state to the closed state of the IPA thereof, in a "slow" manner, which prevents unintentionally hitting the rider.

Upon stopping a motorcycle, the rider thereof may push the shield to open, and put his leg on the ground. However, since the rider has to overcome rejection of the bars to open, or to open the clips that attach the bars to the motorcycle, another solution should be provided. Such a solution is illustrated in FIG. 7.

Figure 7:
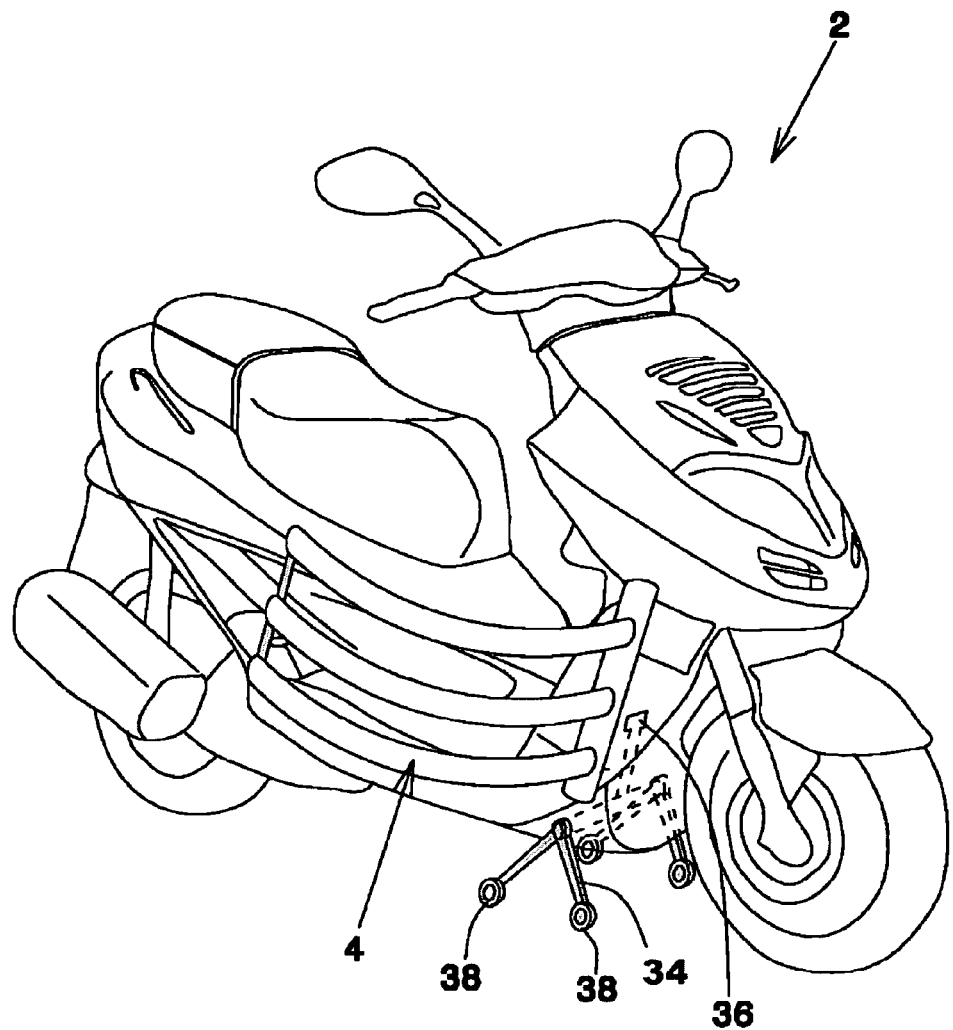
FIG. 7 is a perspective view schematically illustrating an IPA, according to a further embodiment of the invention.

FIG. 7 is a perspective view schematically illustrating an IPA, according to a further embodiment of the invention.

According to this embodiment of the invention, the IPA employs a Wheeled Peg Assembly (WPA), which operates as a foot peg used to keep the motorcycle upright when parking.

The WPA illustrated in FIG. 7 comprises at least two supporting pegs 34, one at each side (left and right) of the motorcycle, a wheel 38 being disposed at the end of each. According to the illustrated embodiment of the invention, pegs 34 are connected to a foot pedal 36. Upon slowing down motorcycle velocity in order to stop, the rider pushes pedal 36, which lowers the wheeled pegs to touch the ground. In this situation the motorcycle may stop, while remaining upright.

According to the embodiment illustrated in FIG. 7, the activation of a WPA is carried out by pressing foot pedal 36.

According to another embodiment of the invention (an example thereof illustrated in FIG. 10), the process of lowering a WPA is carried out by automation, such as detecting that the motorcycle is about to stop by analyzing its velocity and deceleration.

A spring and the like may be employed for returning a peg. For example, upon releasing pedal 36, a spring (not shown) pulls/pushes the peg back.

Figure 8:
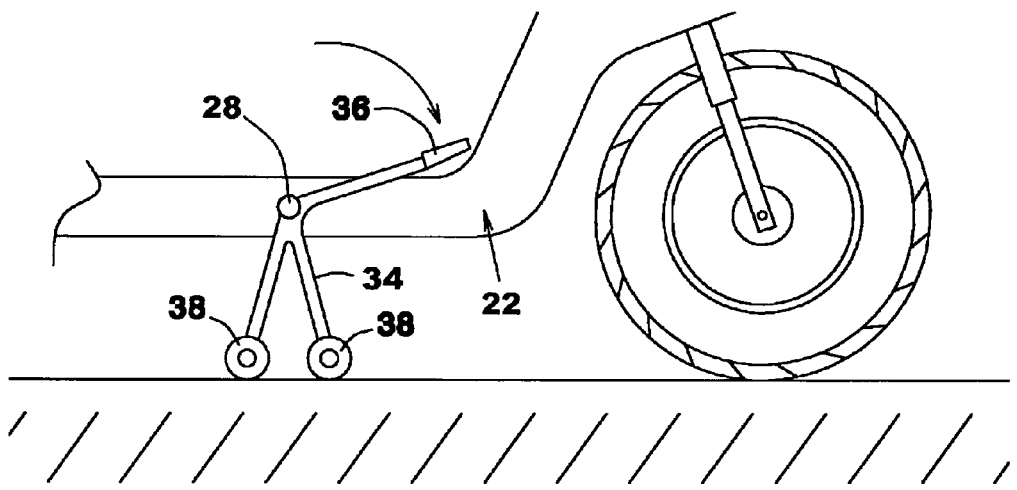
FIGS. 8 and 9 further details the operation of a WPA illustrated in FIG. 7.
Figure 9:
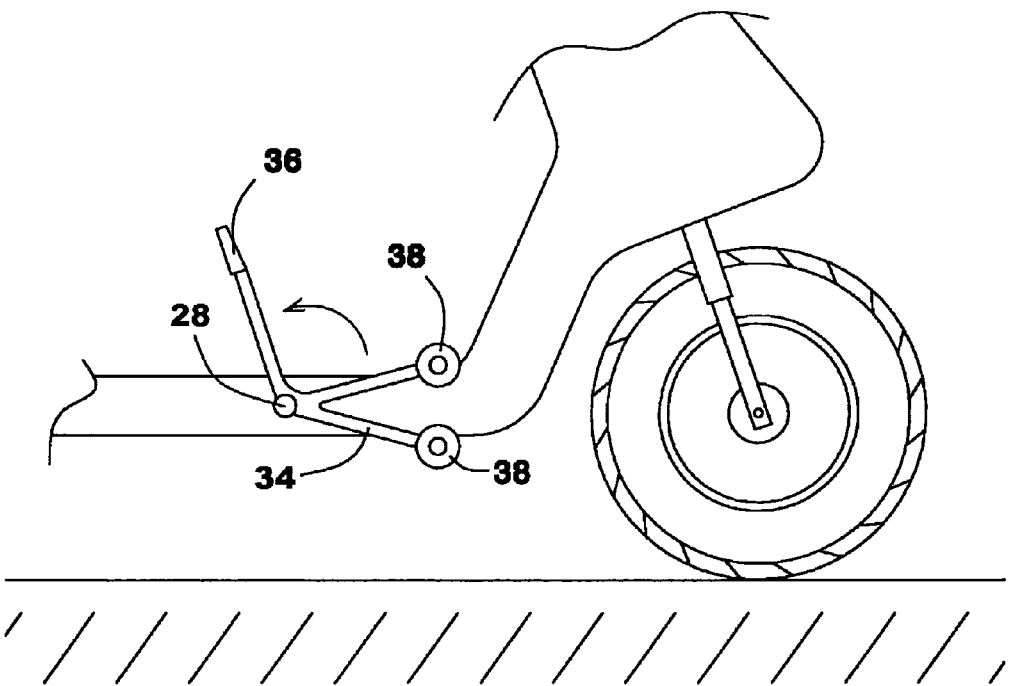

FIGS. 8 and 9 further detail the operation of a WPA illustrated in FIG. 7.

In FIG. 8, the WPA is lowered. Bringing the WPA to this position is carried out by applying force on foot pedal 36 in the direction of the illustrated arrow.

In FIG. 9, the WPA is lifted up. Bringing the WPA to the situation is carried by applying force foot pedal 36 in the illustrated arrow. The force can be applied by a spring (not illustrated), a hydraulic mechanism such as the mechanism that returns the IPA from its open state to its closed state, and so on.

Figure 10:
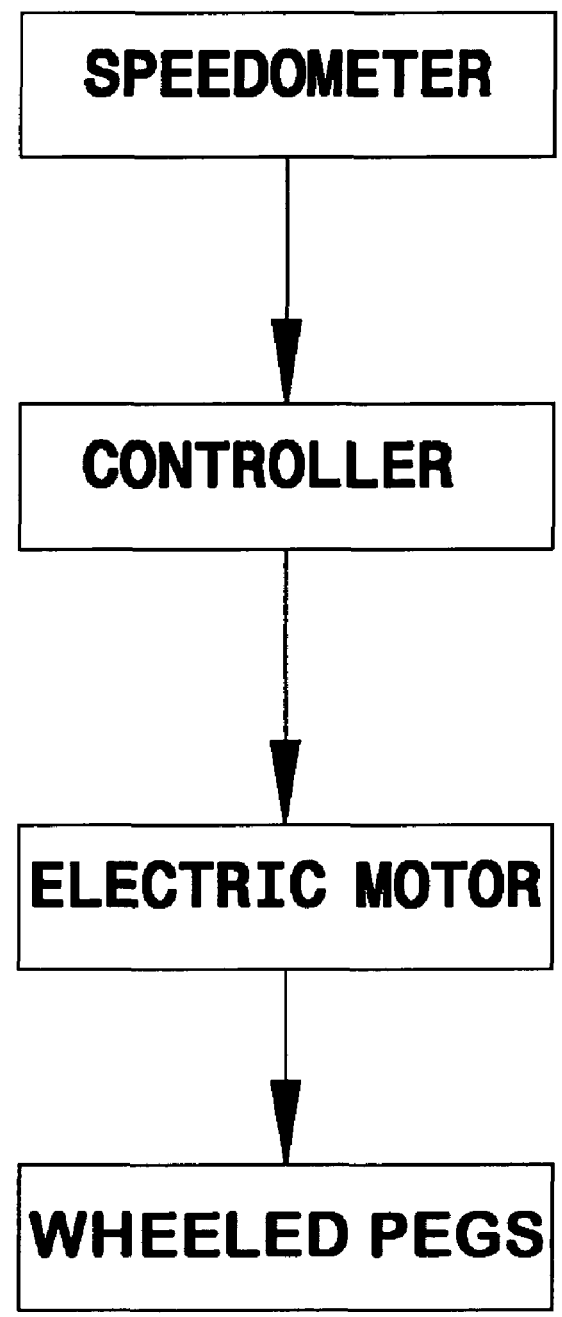
FIG. 10 is a block diagram schematically illustrating an automated mechanism for lowering a WPA, according to one embodiment of the invention.

FIG. 10 is a block diagram schematically illustrating an automated mechanism for lowering a WPA, according to one embodiment of the invention.

The mechanism comprises a controller, which detects a process of stopping the motorcycle by analyzing its velocity and deceleration.

The velocity can be obtained from the speedometer of the motorcycle, and acceleration and deceleration can be detected by comparing the present velocity in a time unit (e.g., of 0.01 seconds) and the velocity in the subsequent time unit. Upon detecting a predetermined velocity (e.g., 3 km per hour) and negative acceleration, i.e., indicating that the rider is about to stop the motorcycle, the controller activates an electric motor which lowers the WPA.

Upon detecting that the motorcycle decelerates, and is moving at a "low" velocity (e.g., less than 3 km per hour), it can be an indication that the motorcycle is stopping, and thereby lowering the WPA. And vice versa: upon detecting that the motorcycle accelerates, and is moving at a "low" velocity (e.g., less than 3 km per hour), this can indicate that the motorcycle is accelerating, and thereby lifting the WPA up.

Each of FIGS. 11, 12 and 13 is a front view of a motorcycle, which schematically illustrates a stage in lowering the peg of a WPA, according to another embodiment of the invention.

FIG. 14 is a side view of FIGS. 11 and 12, and FIG. 15 is a side view of FIG. 13.

The embodiment illustrated in FIGS. 11 to 15 is characterized by the fact that when lowering the WPA, the wheels of the WPA draw away from the motorcycle body, thereby providing a better stability than that according to the embodiment illustrated in FIGS. 7 to 9.

In FIG. 11, the wheels of the WPA are lifted up. In this situation peg 34 is horizontal.

The first stage of lowering the wheels is illustrated in FIG. 12. In this figure, the wheels are moving horizontally away from the motorcycle.

The final stage of lowering the wheels is illustrated in FIG. 13. In this figure, the wheels are lowered due to rotational movement of peg 34 around hinge 18.

When turning the motorcycle left, inertia powers apply force on the left IPA to turn one shield from its closed state to its open state, and vice versa. In order to prevent uncontrolled turning of an IPA from its closed to its open state, a securing mechanism may be used. For example, according to one embodiment of the invention, the IPA can be clipped to the body of the motorcycle by a clip (not illustrated). The clip mechanism may be based on mechanical components (such as a hook), magnetic, electromagnetic, hydraulic, pneumatic, and so on. For example, the force applied by the spring 30 of the hydraulic mechanism of hinge 12 is higher than the expected inertia force under extreme circumstances, such as a sudden tuning of the motorcycle, and therefore secures the IPA to its closed state. Of course, the same mechanisms may be applied to secure the IPA in its open state.

According to one embodiment of the invention, the IPA is designed to allow assembling the parts according to the rider's preferences. For example, one rider may prefer a moderate arc, while another rider may prefer a less moderate arc; one rider may prefer an IPA with three arcs, while another rider may prefer a shield with a different number of arcs. A less moderate arc may provide the rider the option to put his feet on the ground when his motorcycle stops.

According to one embodiment of the invention, the amount of arching is adjustable. This may be achieved, e.g., by segmentation of the arches, such as a telescopic arched bar.

An IPA and WPA may be designed for "simple" composition, especially for a rider or a technician. However, an IPA and WPA may be designed for composing in a production line of a motorcycle manufacturer.

Preferably, hinge 12 is designed for attaching to the chassis of a motorcycle. However, according to another embodiment of the invention, the hinge is designed for attaching to the body of a motorcycle, not necessarily its chassis.

In the figures and/or description herein, the following reference numerals have been mentioned:

numeral 2 denotes a motorcycle;
numeral 4 denotes an injury protection accessory (IPA), according to one embodiment of the invention;
numeral 6 denotes a side of IPA 4 (at the other side thereof is disposed hinge 12);
numeral 8 denotes a wheel of motorcycle 2;
numeral 10 denotes an arc of IPA 4;
numeral 12 denotes the hinge of IPA 4;
each of numerals numeral 14 and 16 denotes a septum that partitions the interior space of hinge 12;
numeral 14 denotes a septum;
numeral 16 denotes a septum;
numeral 18 denotes a hinge of a WPA (wheeled peg assembly);
numeral 20 denotes an obturator (seal);
numeral 22 denotes the lower side of a motorcycle;
numeral 24 denotes a facility for attaching IPA 4 to the chassis or body of motorcycle 2;
numeral 26 denotes a nozzle that connects the space of compartment 40 with the space of compartment 41;
numeral 28 denotes a hinge of a WPA;
numeral 30 denotes a spring which applies force for turning IPA 4 into its closed state;
numeral 32 denotes a one-way valve;
numeral 34 denotes a peg (rod) of a WPA;
numeral 36 denotes a pedal of a WPA;
numeral 38 denotes a wheel of a WPA; and
each of numeral 40, 41, 42, 43 denotes a compartment of the interior side of hinge 12.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

What is claimed is:

1. An injury protection accessory for a riding vehicle, the accessory comprising:
   at least one shield, disposed at a side of said riding vehicle, said shield comprising:
      a substantially vertical hinge, attached to a body or a chassis of said riding vehicle; and
      one or more substantially horizontal bars, attached to said hinge;
   said shield having an open state, in which one edge of the shield is separated from the body of said vehicle, thereby allowing a rider thereof to get off the vehicle, and a closed state, in which both sides of the shield are engaged to the body of said vehicle ; and
      an auto-return mechanism of said shield, for automatically returning said shield from the open state thereof to the closed state thereof,
   thereby protecting the rider from injury.

2. An accessory according to claim 1, wherein said auto return mechanism comprises:
   a receptacle connected to the body of said vehicle, a space of said receptacle being partitioned into two compartments by a septum attached to said bars;
   a one-way valve disposed in said septum, for allowing substance passage from one of said compartments to the other of said compartments in a first amount per time unit;
   a nozzle disposed in said septum, for allowing said substance to pass back in second amount per time unit, wherein said first amount is greater than said second amount;
   a mechanism for applying force on said septum to turn said bars back.

3. An accessory according to claim 2, wherein said mechanism for applying force on said septum is a spring.

4. An accessory according to claim 2, wherein said closed space is a part of an interior of said hinge.

5. An accessory according to claim 2, wherein said substance is fluid.

6. An accessory according to claim 2, wherein said substance is gas.

7. An accessory according to claim 1, wherein said auto return mechanism is selected from a group comprising: a purely mechanical mechanism, hydraulic mechanism, pneumatic mechanism.

8. An accessory according to claim 1, wherein a material of said shield is based on a member of a group comprising: steel, titanium, aluminum, plastic, and metal.

9. An accessory according to claim 1, wherein a curvature of said bars is adjustable.

10. An accessory according to claim 1, wherein said vehicle is a two-wheeled vehicle or a three-wheeled vehicle.

* * * * *